(12) United States Patent
Lopez Martinez

(10) Patent No.: US 12,202,428 B1
(45) Date of Patent: Jan. 21, 2025

(54) SIDE PANEL FOR VEHICLE

(71) Applicant: Faurecia Interior Systems, Inc., Auburn Hills, MI (US)

(72) Inventor: Carlos Gerardo Lopez Martinez, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 18/647,618

(22) Filed: Apr. 26, 2024

(51) Int. Cl.
*B60R 21/21* (2011.01)
*B60J 5/04* (2006.01)
*B60R 21/215* (2011.01)

(52) U.S. Cl.
CPC ............. *B60R 21/21* (2013.01); *B60J 5/0413* (2013.01); *B60R 21/215* (2013.01)

(58) Field of Classification Search
CPC ..... B60R 21/21; B60R 21/215; B60R 21/213; B60R 21/23138
See application file for complete search history.

(56) References Cited

U.S. PATENT DOCUMENTS

| | | | | |
|---|---|---|---|---|
| 3,563,594 | A | * | 2/1971 | London .................. B60J 11/025 293/41 |
| 4,530,519 | A | * | 7/1985 | Marshall ................ B60J 11/025 296/117 |
| 5,316,336 | A | | 5/1994 | Taguchi |
| 5,324,072 | A | | 6/1994 | Olson |
| 7,413,215 | B2 | * | 8/2008 | Weston ................... B60R 21/21 280/730.2 |
| 9,452,666 | B1 | * | 9/2016 | Suh ........................ B60R 16/023 |
| 10,596,991 | B2 | | 3/2020 | Yamauchi |

FOREIGN PATENT DOCUMENTS

EP 590845 B1 8/1996

* cited by examiner

*Primary Examiner* — Faye M Fleming
(74) *Attorney, Agent, or Firm* — Barnes & Thornburg LLP

(57) ABSTRACT

An interior panel for a vehicle includes a first plate, a second plate, and a hinge extending between and interconnecting the first plate and the second plate. The hinge establishes a plate pivot axis about which the first plate is configured to pivot from a closed position to an opened position.

20 Claims, 5 Drawing Sheets

SIDE PANEL FOR VEHICLE

BACKGROUND

The present disclosure relates to a vehicle, and particularly to an interior component for a vehicle. More particularly, the present disclosure relates to an interior panel for a vehicle.

SUMMARY

According to the present disclosure, an interior panel for a vehicle includes a first plate, a second plate, and a hinge. The first plate has an outer surface facing toward a cabin of the vehicle and an opposite, inner surface facing away from the cabin of the vehicle. The second plate has an outer surface facing toward the cabin of the vehicle and an opposite, inner surface facing away from the cabin of the vehicle. The hinge extends between and interconnects the first plate and the second plate.

In illustrative embodiments, the hinge establishes a plate pivot axis about which the first plate is configured to pivot from a closed position arranged generally perpendicular to the second plate and an opened position. In illustrative embodiments, the first plate, the second plate, and the hinge are formed integrally with one another by injection molding.

In illustrative embodiments, the first plate and the second plate each includes a force-distributing pad coupled to the inner surface of each corresponding plate. The force distributing pads are configured to reduce impact forces acting on an occupant of the vehicle during a collision event from both the interior panel and an airbag included in the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
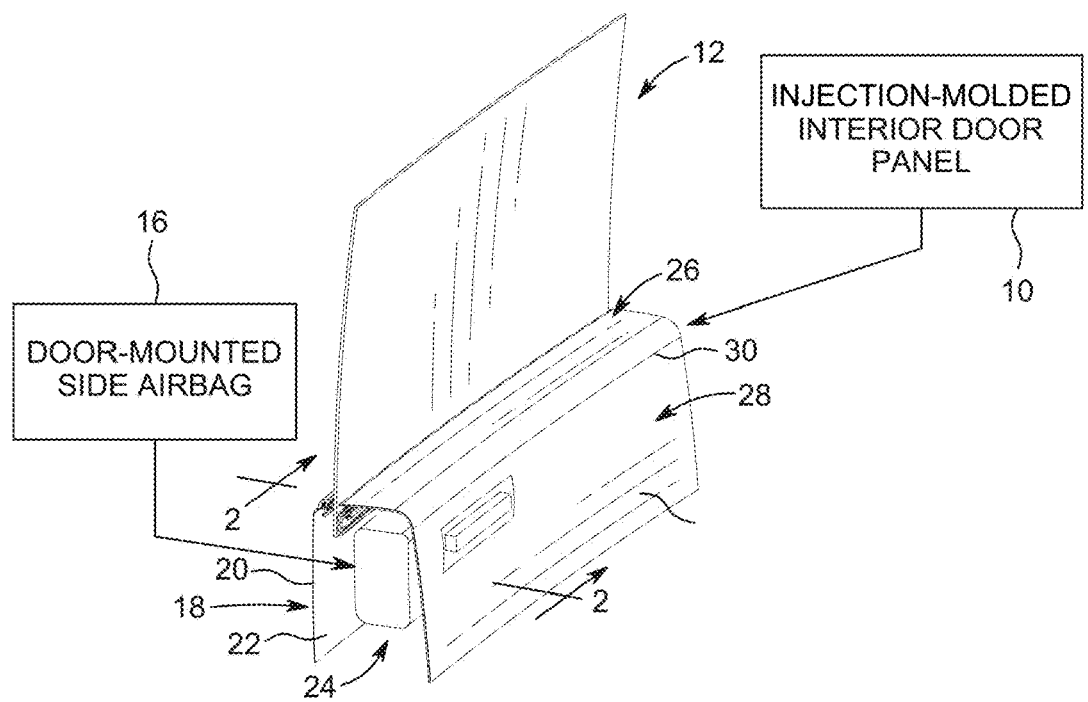
FIG. 1 is a perspective view of a vehicle door including an interior door panel, in accordance with the present disclosure.
Figures 2, 3:
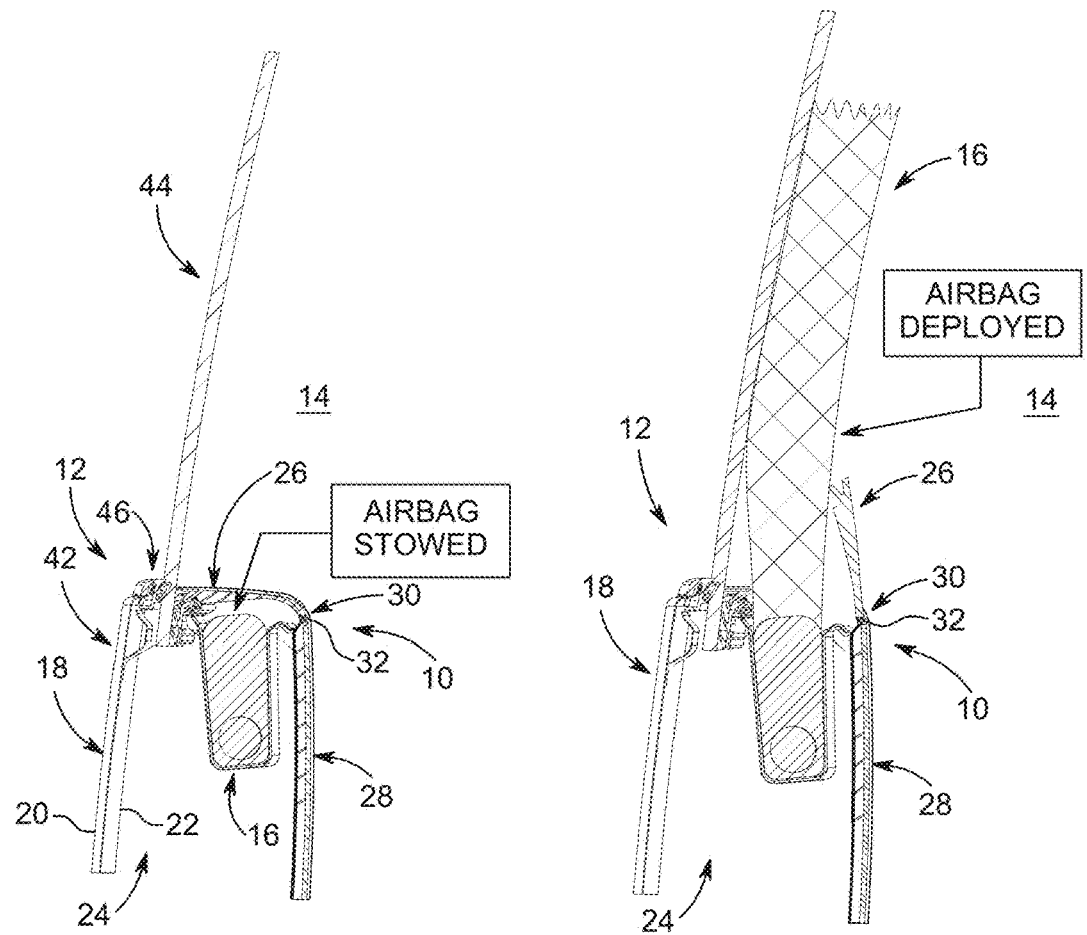
FIG. 2 is a cross section taken along line 2-2 in FIG. 1 showing that the vehicle door further includes an exterior panel and an airbag stored within a wall cavity between the exterior panel and the interior panel.
FIG. 3 is a cross section similar to FIG. 2 showing the airbag deployed and showing that the interior door panel includes a first plate, a second plate, and a hinge that allows pivotable movement of the first plate relative to the second plate in response to forces acting on the first plate by the airbag.

An interior door panel 10, in accordance with the present disclosure, is included in a cabin wall or door 12 of a vehicle as shown in FIGS. 1-3. The interior door panel 10 is formed integrally by molding the interior door panel 10 to provide a seamless boundary to an interior cabin 14 on the door 12 of the vehicle. The interior door panel 10 is formed to include one or more integral features to function with a door-mounted, side airbag 16 covered by the interior door panel 10. The interior door panel 10 facilitates deployment of the airbag 16 in the event of a collision event experienced by the vehicle and increases protection for an occupant of the vehicle with the airbag 16.

The door 12 includes an exterior panel 18, the interior panel 10, and the airbag 16 as shown in FIGS. 1-3. The exterior panel 18 has an exterior surface 20 facing away from the cabin 14 of the vehicle and an opposite interior surface 22 facing toward the cabin 14 of the vehicle. The interior panel 10 is arranged to lie within the interior cabin 14 of the vehicle and is at least partially spaced apart from the exterior panel 18 to provide a wall cavity 24 between the exterior panel 18 and the interior panel 10. The airbag 16 is coupled to at least one of the exterior panel 18 and the interior panel 10 within the wall cavity 24. The airbag 16 is configured to change from a stored position within the wall cavity 24, and a deployed position extending from the wall cavity to provide a protective barrier between at least a portion of the exterior panel 18 and an occupant seated in the interior cabin 14 of the vehicle.

The interior panel 10 includes a first plate 26, a second plate 28 arranged at an angle relative to the first plate 26, and a hinge 30 interconnecting the first plate 26 and the second plate 28 to establish a pivot axis 32 as shown in FIGS. 2 and 3. The first plate 26 is configured to pivot about the pivot axis 32 from a closed position and an opened position. In the closed position, the first plate 26 covers the airbag 16 and extends generally perpendicularly to the second plate 28 when the airbag 16 is in the stored position to enclose the airbag 16 in the wall cavity 24. Illustratively, "generally perpendicularly" means that the first plate 26 is within a range of about 80 degrees to about 100 degrees from the second plate 28 in the closed position.

Figures 7A, 7B:
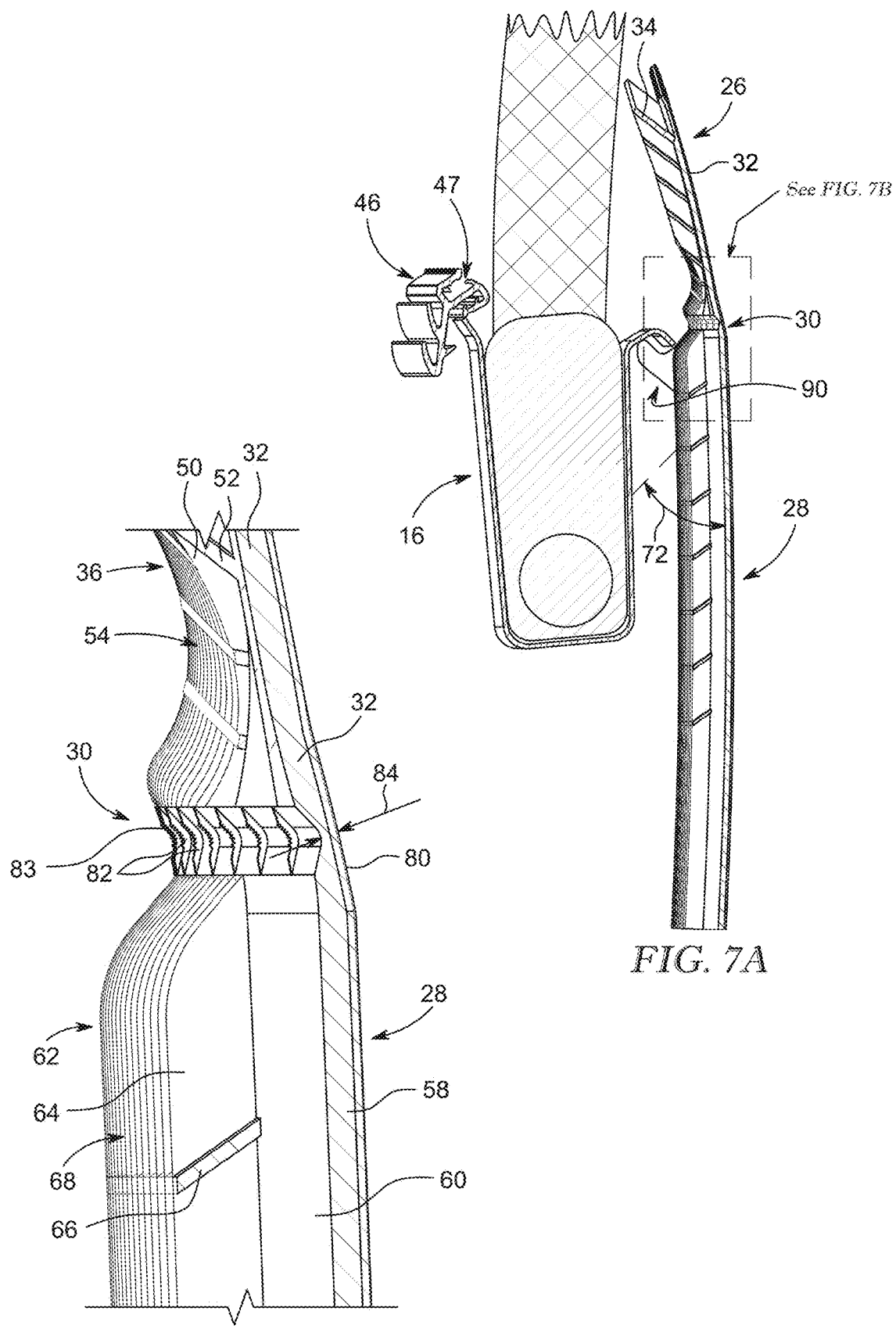
FIG. 7A is a side view of the interior panel and the airbag in a deployed position showing the first panel substantially parallel to the second panel.
FIG. 7B is an enlarged view of a portion of FIG. 7A showing the plurality frangible ribs broken in response to the first panel pivoting upwardly by the airbag.

In the opened position, the first plate 26 is arranged at a greater angle (i.e. at least parallel or at least 180 degrees) relative to the second plate 28 compared to the closed position as shown in FIGS. 7A and 7B. The first plate 26 is configured to pivot about the hinge 30 to the opened position in response to the airbag 16 activating during the collision event and changing from the stowed position to the deployed position. Although the interior panel 10 is shown and described with reference to a door of a vehicle, it should be appreciated that the interior panel 10 can be coupled to any part of a vehicle to form a part of any panel within the cabin of the vehicle.

Figure 4:
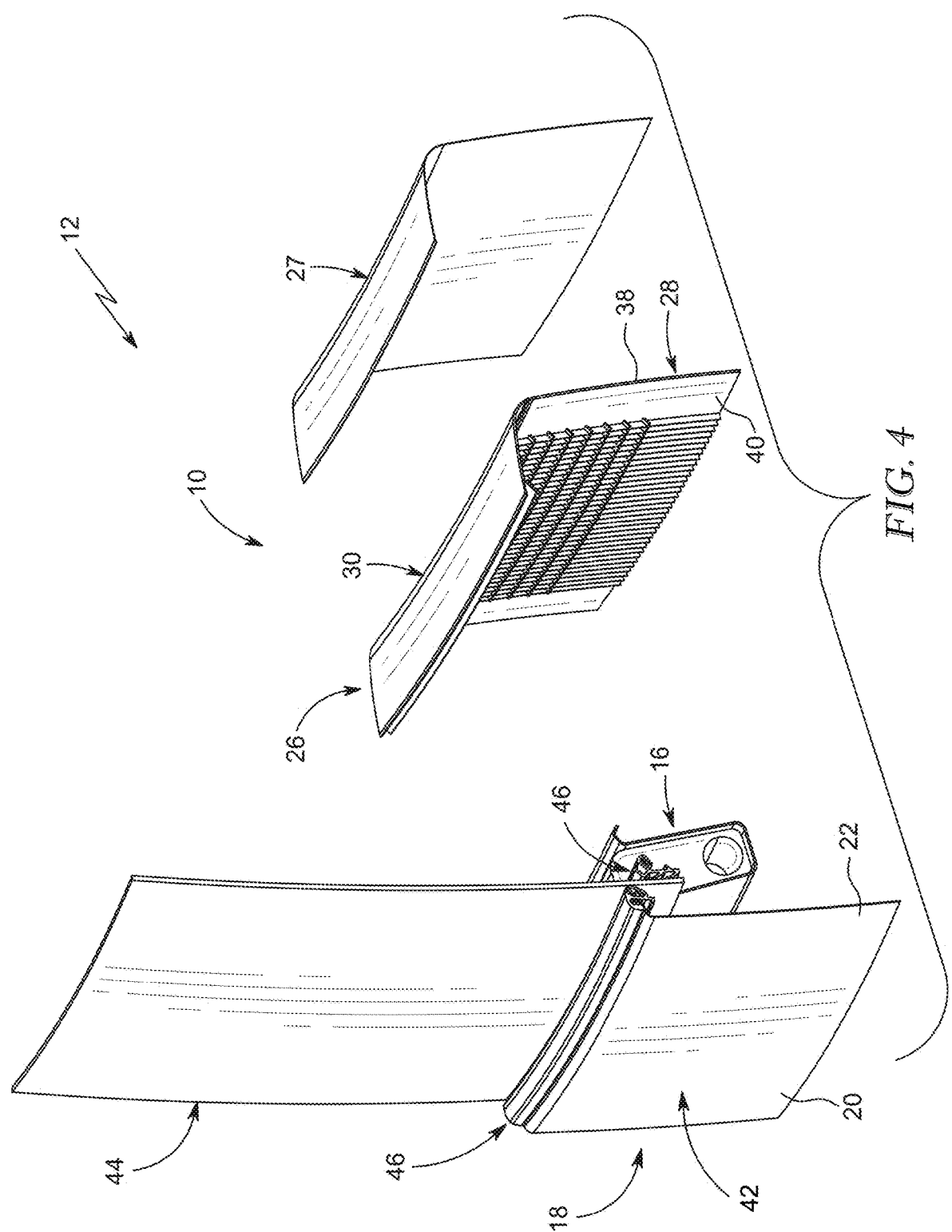
FIG. 4 is an exploded assembly view of the vehicle door showing that the vehicle door further includes an outer cover configured to cover the first plate, the second plate, and the hinge.
Figure 5:
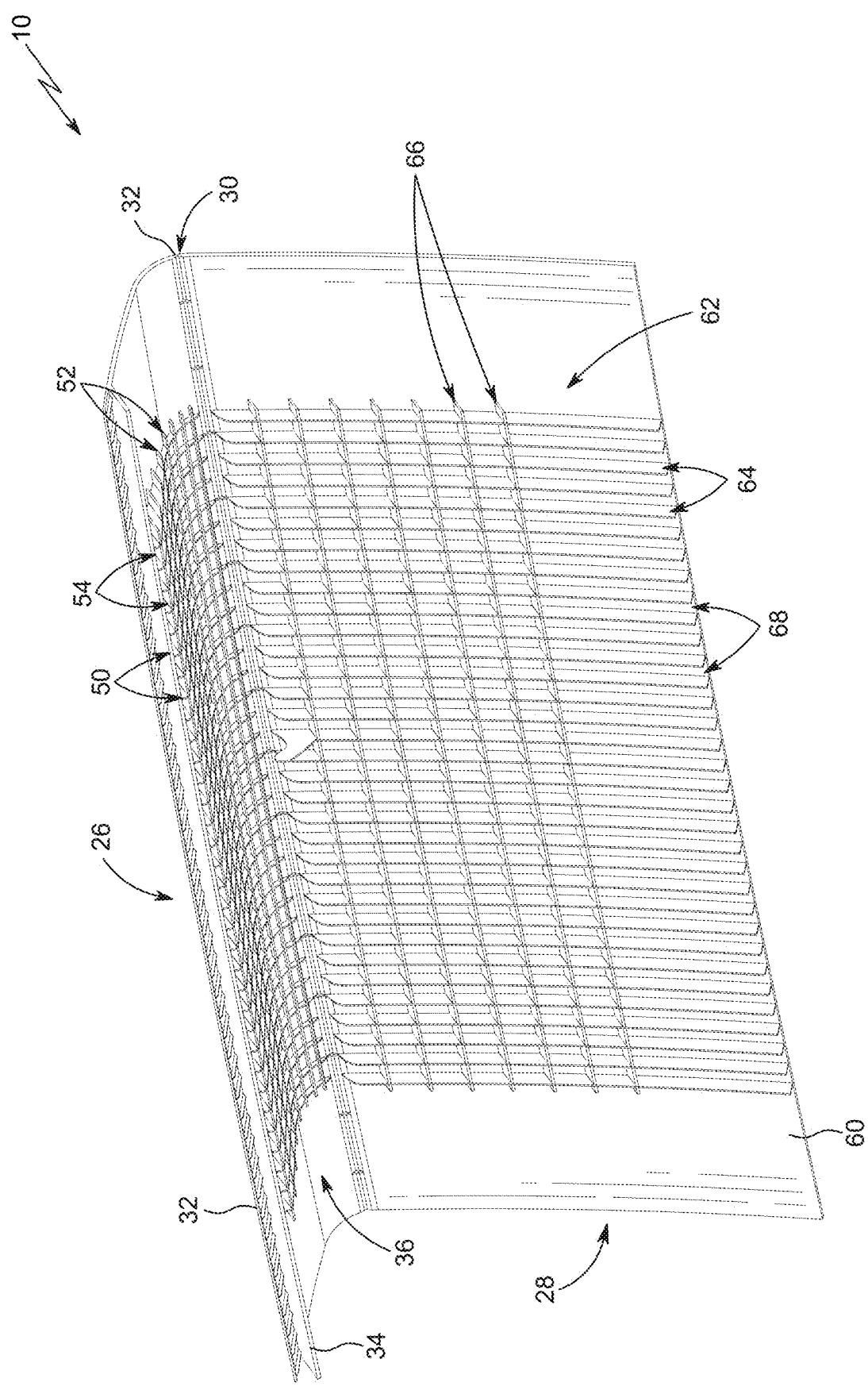
FIG. 5 is a perspective view of the interior panel showing that each plate includes an outer sheet and a force-distributing pad coupled to an interior surface of the outer sheet to interact with the airbag and distribute forces from the airbag during deployment.

The first plate 26 includes an outer sheet 32, a plate mount 34, and a force-distributing pad 36 as shown in FIGS. 4 and 5. The outer sheet 32 has an outer surface 38 facing toward the cabin interior 14 and an inner surface 40 facing toward the wall cavity 24 and the airbag 16. The plate mount 34 is coupled to the outer sheet 32 and is configured to engage a portion of the exterior panel 18 to retain the first plate 26 in the closed position. The force-distributing pad 36 is coupled to the inner surface 40 of the outer sheet 32 and is configured to engage the airbag 16 during movement of the airbag from the stowed position to the deployed position to reduce impact forces acting on the occupant from the airbag.

Figures 6A, 6B:
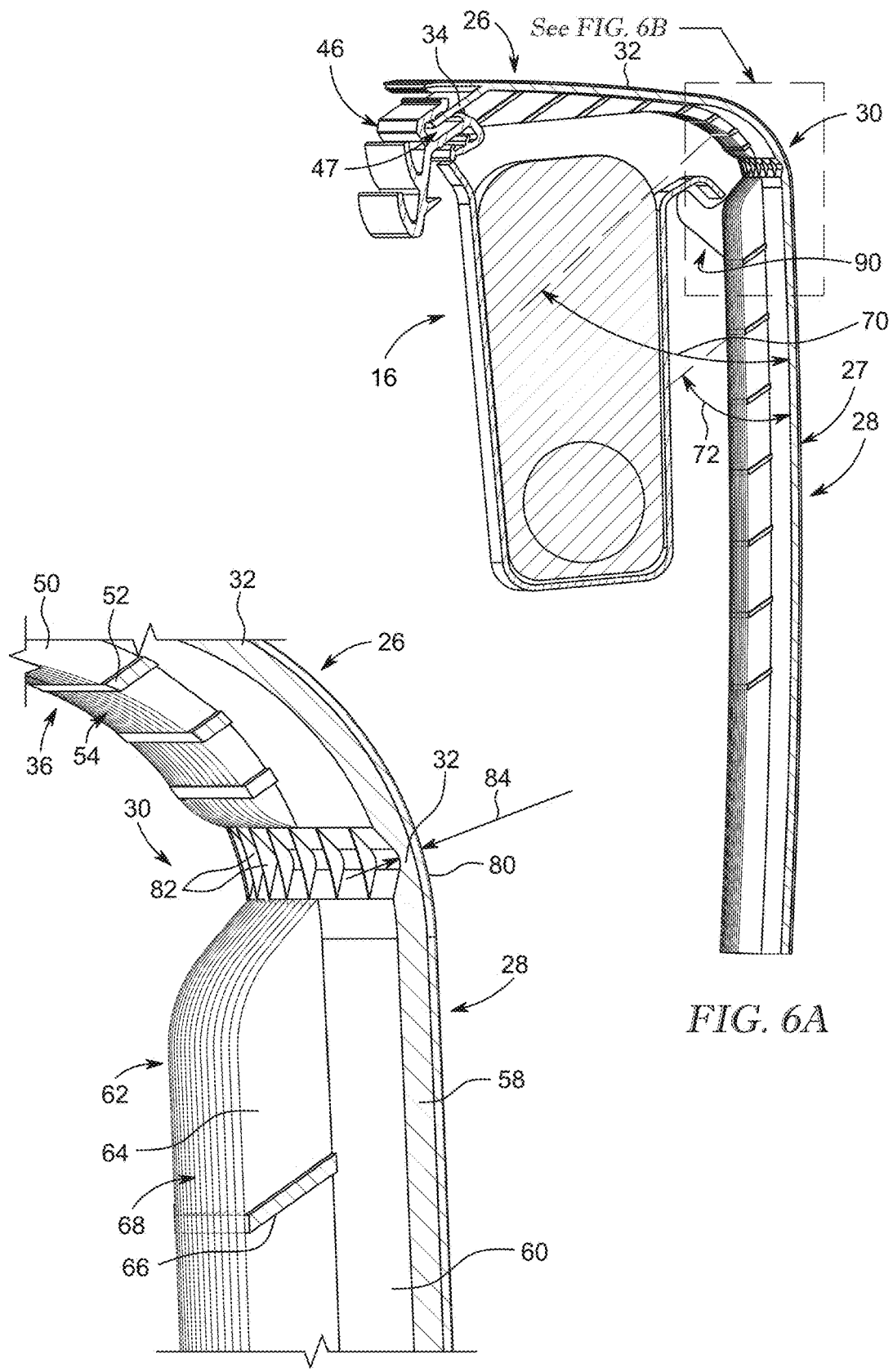
FIG. 6A is a side view of the interior panel and the airbag in a stowed position showing the first panel substantially perpendicular to the second panel.
FIG. 6B is an enlarged view of a portion of FIG. 6A showing that the hinge a reduced thickness relative to the rest of the interior panel and a plurality frangible ribs to reinforce the hinge prior to deployment of the airbag.

In the illustrative embodiment, the interior panel 10 further includes an outer cover 27 configured to cover the first panel 26, the second panel 28, and the hinge 30 as suggested in FIG. 4 and shown in FIG. 6A. The outer cover 27 may be formed separately from the rest of the interior panel 10 or co-molded with the rest of the interior panel 10. The outer cover 27 can include one or more of foam, leather, cloth, trim, rubber, etc.

The exterior panel 18 includes an exterior door panel 42, a window 44 coupled to the exterior door panel 42, and a window seal 46 as shown in FIGS. 2-4. The second plate 32 of the interior panel 26 extends alongside the exterior door panel 42 and the first plate 26 extends away from the second plate 28 toward the exterior door panel 42 and the window 44 to cover an upper aperture 48 opening into the wall cavity 24 between the exterior panel 18 and the interior panel 10. The airbag 16 is configured to extend out of the upper aperture and alongside the window 44 in the deployed position to locate a portion of the airbag 16 laterally between the window 44 and the first plate 26 such that the force-distributing pad 36 of the first plate 26 cooperates with the airbag 16 to provide a protective barrier for the occupant during the collision event. The window 44 may be fixed in place or may be movable relative to the exterior door panel 42. The window seal 46 blocks moisture from entering the wall cavity 24 and/or the cabin interior 14. The plate mount 34 of the first plate 26 is configured to extend into a recess 47 provided by the window seal 46 to secure the first plate 26 in place until the airbag 16 activates.

The force-distributing pad 36 includes a plurality of ribs 50, 52 having a plurality of longitudinal ribs 50 and a plurality of transverse ribs 52 as shown in FIGS. 5 and 6A. The plurality of ribs 50, 52 are coupled to the inner surface 40 of the outer sheet 32 and extend away from the outer sheet 32 into the wall cavity 24 to interact with the airbag 16 when the airbag 16 is activated. The plurality of ribs 50, 52 increase a contact area of the airbag to distribute the forces from the airbag 16 across a greater area compared to other panels that do not have a force-distributing pad.

The plurality of longitudinal ribs 50 extend along the outer sheet 32 and are spaced apart from one another to provide a plurality of channels 56 therebetween as shown in FIG. 5. The plurality of transverse ribs 52 are arranged to lie within the first plurality of channels 54 and extend substantially perpendicularly to the plurality of longitudinal ribs 50.

The second plate 28 includes a second outer sheet 58 and a second force-distributing pad 62 having a second plurality of ribs 64, 66 coupled to an inner surface 60 of the second outer sheet 58 as shown in FIGS. 5 and 6B. The second plurality of ribs include a second plurality of longitudinal ribs 64 extending along the second plate 28 and spaced apart from one another to provide a second plurality of channels 68 and a second plurality of transverse ribs 66 arranged to lie within the second plurality of channels 68.

The first plurality of transverse ribs 52 extend away from the first outer sheet 32 at a first angle 70 relative to the second outer sheet 58 and the second plurality of transverse ribs 66 extend away from the second outer sheet 58 at a second angle 72 relative to the second outer sheet 58 as shown in FIG. 6A. The first angle and the second angles 70, 72 are each within a range of about 50 degrees to about 60 degrees from the second outer sheet 58. This allows the interior panel 10 to release from a mold when the interior panel 10 is formed by injection molding, for example.

The first and second longitudinal ribs 52, 64 are aligned with one another in the illustrative embodiment as shown in FIG. 5. The first plurality of channels 54 have the same or similar width as the second plurality of channels 68. Each transverse rib 52, 66 contacts at least one longitudinal rib 50, 64 and terminates at the same point as the longitudinal rib 50, 64 that it contacts.

The hinge 30 includes a hinge body 80 and a plurality of frangible retainer ribs 82 coupled to the hinge body 80 as shown in FIGS. 6A-7B. The hinge body 80 has a thickness 84 less than a thickness of both the first outer sheet 32 and the second outer sheet 58. The plurality of frangible retainer ribs 82 extend between the first outer sheet 32 and the second outer sheet 58. The plurality of frangible retainer ribs 82 are configured to retain the first plate 26 in the closed position and are configured to break as the first plate 26 pivots about the plate pivot axis 32 from the closed position to the opened position in response to a force acting on the force-distributing pad 36 of the first plate 26 above a predetermined amount. The plurality of frangible retainer ribs 82 fracture along beak lines 83 when the first plate 26 pivots away from the airbag 16 as portions of the frangible retainer ribs 82 pull away from one another. While the break lines 83 are shown as occurring through a middle of each frangible retainer rib 82, the break lines 83 may occur anywhere in frangible retainer ribs 82.

The second plate 28 further includes an airbag retainer 90 coupled to the inner surface 60 of the second outer sheet 58 as shown in FIGS. 5 and 6A. The airbag retainer 90 extends away from the second outer sheet 58 to support the airbag 16 within the wall cavity 24.

The following numbered clauses include embodiments that are contemplated and non-limiting:

Clause 1. A cabin wall bordering an interior cabin of a vehicle including an exterior panel having an exterior surface facing away from the cabin of the vehicle and an opposite interior surface facing toward the cabin of the vehicle.

Clause 2. The cabin wall of clause 1, any other suitable clause, or any suitable combination of clauses, including an interior panel arranged to lie within the interior cabin of the vehicle and at least partially spaced apart from the exterior panel to provide a wall cavity between the exterior panel and the interior panel.

Clause 3. The cabin wall of clause 2, any other suitable clause, or any suitable combination of clauses, including an airbag coupled to at least one of the exterior panel and the interior panel and configured to change from a stored position arranged to lie within the wall cavity, and a deployed position extending from the wall cavity to provide a protective barrier between at least a portion of the exterior panel and an occupant seated in the interior cabin of the vehicle.

Clause 4. The cabin wall of clause 3, any other suitable clause, or any suitable combination of clauses, wherein the interior panel includes a first plate, a second plate arranged at an angle relative to the first plate, and a hinge interconnecting the first plate and the second plate to establish a pivot axis.

Clause 5. The cabin wall of clause 4, any other suitable clause, or any suitable combination of clauses, wherein the first plate is configured to pivot about the pivot axis from a closed position when the airbag is in the stored position to enclose the airbag in the wall cavity, to an opened position in response to the airbag changing to the deployed position.

Clause 6. The cabin wall of clause 5, any other suitable clause, or any suitable combination of clauses, including wherein the first plate includes an outer sheet having an outer surface facing toward the cabin interior and an inner surface facing toward the wall cavity and the airbag.

Clause 7. The cabin wall of clause 6, any other suitable clause, or any suitable combination of clauses, wherein the first plate includes a plate mount coupled to the outer sheet and configured to engage a portion of the exterior panel to retain the first plate in the closed position.

Clause 8. The cabin wall of clause 7, any other suitable clause, or any suitable combination of clauses, wherein the first plate includes a force-distributing pad coupled to the inner surface of the outer sheet and configured to engage the airbag during movement of the airbag from the stowed position to the deployed position to reduce impact forces acting on the occupant from the airbag.

Clause 9. The cabin wall of clause 8, any other suitable clause, or any suitable combination of clauses, wherein the exterior panel includes an exterior door panel and a window coupled to the exterior door panel.

Clause 10. The cabin wall of clause 9, any other suitable clause, or any suitable combination of clauses, wherein the second plate extends alongside the exterior door panel and the first plate extends away from the second plate toward the exterior door panel and the window to cover an upper aperture opening into the wall cavity between the exterior panel and the interior panel.

Clause 11. The cabin wall of clause 10, any other suitable clause, or any suitable combination of clauses, wherein the airbag is configured to extend out of the upper aperture and alongside the window in the deployed position to locate a portion of the airbag laterally between the window and the first plate such that the force-distributing pad of the first plate cooperates with the airbag to provide a protective barrier for the occupant during the collision event.

Clause 12. The cabin wall of clause 11, any other suitable clause, or any suitable combination of clauses, wherein the force-distributing pad includes a first plurality of ribs coupled to the inner surface of the first outer sheet.

Clause 13. The cabin wall of clause 12, any other suitable clause, or any suitable combination of clauses, wherein the second plate further includes a second force-distributing pad having a second plurality of ribs coupled to the inner surface of the second outer sheet.

Clause 14. The cabin wall of clause 13, any other suitable clause, or any suitable combination of clauses, the first plurality of ribs including a first plurality of longitudinal ribs extending along the first plate and spaced apart from one another to provide a first plurality of channels and a first plurality of transverse ribs arranged to lie within the first plurality of channels.

Clause 15. The cabin wall of clause 14, any other suitable clause, or any suitable combination of clauses, the second plurality of ribs including a second plurality of longitudinal ribs extending along the second plate and spaced apart from one another to provide a second plurality of channels and a second plurality of transverse ribs arranged to lie within the second plurality of channels.

Clause 16. The cabin wall of clause 15, any other suitable clause, or any suitable combination of clauses, wherein the first plurality of transverse ribs and the second plurality of transverse ribs are arranged to lie at an angle relative to the second outer sheet and the angle is within a range of about 50 degrees to about 60 degrees.

Clause 17. An injection molded, interior door panel for a door of a vehicle, the door panel comprising a first plate.

Clause 18. The door panel of clause 17, any other suitable clause, or any suitable combination of clauses, the first plate including a first outer sheet having an outer surface facing toward a cabin of the vehicle and an opposite, inner surface facing away from the cabin of the vehicle and a first panel mount coupled to the first outer sheet and configured to mount to a portion of the vehicle.

Clause 19. The door panel of clause 18, any other suitable clause, or any suitable combination of clauses, including a second plate.

Clause 20. The door panel of clause 19, any other suitable clause, or any suitable combination of clauses, the second plate including a second outer sheet having an outer surface facing toward the cabin of the vehicle and an opposite, inner surface facing away from the cabin of the vehicle.

Clause 21. The door panel of clause 20, any other suitable clause, or any suitable combination of clauses, including a hinge.

Clause 22. The door panel of clause 21, any other suitable clause, or any suitable combination of clauses, the hinge extending between and interconnecting the first outer sheet and the second outer sheet to establish a plate pivot axis about which the first plate is configured to pivot from a closed position arranged generally perpendicular to the second plate and an opened position.

Clause 23. The door panel of clause 22, any other suitable clause, or any suitable combination of clauses, wherein the first plate further includes a force-distributing pad coupled to the inner surface of the first outer sheet and configured to reduce impact forces acting on an occupant of the vehicle during a collision event.

Clause 24. The door panel of clause 23, any other suitable clause, or any suitable combination of clauses, wherein the force-distributing pad includes a first plurality of ribs coupled to the inner surface of the first outer sheet.

Clause 25. The door panel of clause 24, any other suitable clause, or any suitable combination of clauses, wherein the second plate further includes a second force-distributing pad coupled to the inner surface of the second outer sheet and configured to reduce impact forces acting on the occupant of the vehicle.

Clause 26. The door panel of clause 25, any other suitable clause, or any suitable combination of clauses, wherein the first plurality of ribs includes a first plurality of longitudinal ribs extending along the first plate and spaced apart from one another to provide a first plurality of channels between neighboring longitudinal ribs included in the first plurality of longitudinal ribs, and a first plurality of transverse ribs arranged to lie within the first plurality of channels.

Clause 27. The door panel of clause 26, any other suitable clause, or any suitable combination of clauses, wherein the second force-distributing pad includes a second plurality of ribs coupled to the inner surface of the second outer sheet and extending away from the inner surface of the second outer sheet.

Clause 28. The door panel of clause 27, any other suitable clause, or any suitable combination of clauses, wherein the second plurality of ribs includes a second plurality of longitudinal ribs extending along the second outer sheet and spaced apart from one another to provide a second plurality of channels between neighboring longitudinal ribs included in the second plurality of longitudinal ribs, and a second plurality of transverse ribs arranged to lie within the second plurality of channels.

Clause 29. The door panel of clause 28, any other suitable clause, or any suitable combination of clauses, wherein the first plurality of transverse ribs extend away from the first outer sheet at a first angle relative to the second outer sheet and the second plurality of transverse ribs extend away from the second plate at a second angle relative to the second outer sheet.

Clause 30. The door panel of clause 29, any other suitable clause, or any suitable combination of clauses, wherein the first angle and the second angle are each within a range of about 50 degrees to about 60 degrees from the second outer sheet.

Clause 31. The door panel of clause 30, any other suitable clause, or any suitable combination of clauses, wherein the force-distributing pad includes a first plurality of ribs coupled to the inner surface of the first outer sheet and the second plate further includes a second force-distributing pad having a second plurality of ribs coupled to the inner surface of the second outer sheet, the first plurality of ribs including a first plurality of longitudinal ribs extending along the first plate and spaced apart from one another, and the second plurality of ribs including a second plurality of longitudinal ribs extending along the second plate and aligned with the first plurality of longitudinal ribs.

Clause 32. The door panel of clause 31, any other suitable clause, or any suitable combination of clauses, wherein the hinge includes a hinge body having a thickness less than the first outer sheet and the second outer sheet and a plurality of frangible retainer ribs coupled to the hinge body and extending between the first outer sheet and the second outer sheet, wherein the plurality of frangible retainer ribs are configured to retain the first plate in the closed position and are configured to break as the first plate pivots about the plate pivot axis from the closed position to the opened position in response to a force acting on the force-distributing pad of the first plate above a predetermined amount.

Clause 33. The door panel of clause 32, any other suitable clause, or any suitable combination of clauses, wherein the second plate further includes a retainer hook coupled to the inner surface of the second outer sheet and extending away from the second outer sheet to support an airbag.

Clause 34. An injection molded, interior panel for a vehicle, the interior panel comprising a first plate.

Clause 35. The interior panel of clause 34, any other suitable clause, or any suitable combination of clauses, including a second plate.

Clause 36. The interior panel of clause 35, any other suitable clause, or any suitable combination of clauses, including a hinge extending between and interconnecting the first plate and the second plate to establish a plate pivot axis about which the first plate is configured to pivot from a closed position arranged generally perpendicular to the second plate and an opened position arranged generally parallel with the second plate.

Clause 37. The interior panel of clause 36, any other suitable clause, or any suitable combination of clauses, wherein the first and second plates each include a sheet having an inner surface facing away from a cabin of the vehicle and an outer surface facing into the cabin of the vehicle, and at least one of the first plate and the second plate includes a force-distributing pad coupled to the inner surface and configured to reduce impact forces acting on an occupant of the vehicle during a collision event.

Clause 38. The interior panel of clause 37, any other suitable clause, or any suitable combination of clauses, wherein the force-distributing pad includes a plurality of longitudinal ribs extending along the inner surface and spaced apart from one another to provide a plurality of channels and a plurality of transverse ribs arranged to lie within the first plurality of channels, and wherein the plurality of transverse ribs are arranged to lie at an angle relative to the sheet of the second plate and the angle is within a range of about 50 degrees to about 60 degrees.

Clause 39. The interior panel of clause 38, any other suitable clause, or any suitable combination of clauses, wherein the force-distributing pad is coupled to the inner surface of the first plate and the second plate includes a second force-distributing pad having a second plurality of longitudinal ribs coupled to the inner surface of the second plate and aligned with the plurality of longitudinal ribs coupled to the inner surface of the first plate and a second plurality of transverse ribs arrange to lie in a second plurality of channels defined by the second plurality of longitudinal ribs and at the angle.

Clause 40. The interior panel of clause 39, any other suitable clause, or any suitable combination of clauses, wherein the hinge includes a hinge body having a thickness less than the first outer sheet and the second outer sheet and a plurality of frangible retainer ribs coupled to the hinge body and extending between the first outer sheet and the second outer sheet, wherein the plurality of frangible retainer ribs are configured to retain the first plate in the closed position and are configured to break as the first plate pivots about the plate pivot axis from the closed position to the opened position in response to a force acting on the force-distributing pad of the first plate above a predetermined amount.

Clause 41. The interior panel of clause 40, any other suitable clause, or any suitable combination of clauses, wherein the second plate further includes a retainer hook coupled to the inner surface of the second plate and extending away from the inner surface to support an airbag.

Clause 42. The interior panel of clause 35, any other suitable clause, or any suitable combination of clauses, including a hinge extending between and interconnecting the first plate and the second plate to establish a plate pivot axis about which the first plate is configured to pivot from a closed position forming a first angle in a range of 80 degrees to 100 degrees there between and an opened position in which the a second angle is greater than about 160 degrees there between.

Clause 43. The interior panel of clause 42, wherein the second angle is in a range of about 160 degrees to 200 degrees.

The invention claimed is:

1. A cabin wall bordering an interior cabin of a vehicle, the cabin wall comprising:
   an exterior panel having an exterior surface facing away from the cabin of the vehicle and an opposite interior surface facing toward the cabin of the vehicle,
   an interior panel arranged to lie within the interior cabin of the vehicle and at least partially spaced apart from the exterior panel to provide a wall cavity between the exterior panel and the interior panel, and an airbag coupled to at least one of the exterior panel and the interior panel and configured to change from a stored position arranged to lie within the wall cavity, and a deployed position extending from the wall cavity to provide a protective barrier between at least a portion of the exterior panel and an occupant seated in the interior cabin of the vehicle, wherein the interior panel includes a first plate, a second plate arranged at an angle relative to the first plate, and a hinge interconnecting the first plate and the second plate to establish a pivot axis, and the first plate is configured to pivot about the pivot axis from a closed position when the airbag is in the stored position to enclose the airbag in the wall cavity, to an opened position in response to the airbag changing to the deployed position, and wherein the first plate includes: (i) an outer sheet having an outer surface facing toward the cabin interior and an inner surface facing toward the wall cavity and the airbag, (ii) a plate mount coupled to the outer sheet and configured to engage a portion of the exterior panel to retain the first plate in the closed position, and (iii) a force-distributing pad coupled to the inner surface of the outer sheet and configured to engage the airbag during movement of the airbag from the stowed position to the deployed position to reduce impact forces acting on the occupant from the airbag.

2. The cabin wall of claim 1, wherein the exterior panel includes an exterior door panel and a window coupled to the exterior door panel, wherein the second plate extends alongside the exterior door panel and the first plate extends away from the second plate toward the exterior door panel and the window to cover an upper aperture opening into the wall cavity between the exterior panel and the interior panel, and wherein the airbag is configured to extend out of the upper aperture and alongside the window in the deployed position to locate a portion of the airbag laterally between the window and the first plate such that the force-distributing pad of the first plate cooperates with the airbag to provide a protective barrier for the occupant during the collision event.

3. The cabin wall of claim 2, wherein the force-distributing pad includes a first plurality of ribs coupled to the inner surface of the first outer sheet and the second plate further includes a second force-distributing pad having a second plurality of ribs coupled to the inner surface of the second outer sheet, the first plurality of ribs including a first plurality of longitudinal ribs extending along the first plate and spaced apart from one another to provide a first plurality of channels and a first plurality of transverse ribs arranged to lie within the first plurality of channels, and the second plurality of ribs including a second plurality of longitudinal ribs extending along the second plate and spaced apart from one another to provide a second plurality of channels and a second plurality of transverse ribs arranged to lie within the second plurality of channels.

4. The cabin wall of claim 3, wherein the first plurality of transverse ribs and the second plurality of transverse ribs are arranged to lie at an angle relative to the second outer sheet and the angle is within a range of about 50 degrees to about 60 degrees.

5. An injection molded, interior door panel for a door of a vehicle, the door panel comprising:

a first plate including a first outer sheet having an outer surface facing toward a cabin of the vehicle and an opposite, inner surface facing away from the cabin of the vehicle and a first panel mount coupled to the first outer sheet and configured to mount to a portion of the vehicle, and, a second plate including a second outer sheet having an outer surface facing toward the cabin of the vehicle and an opposite, inner surface facing away from the cabin of the vehicle, and a hinge extending between and interconnecting the first outer sheet and the second outer sheet to establish a plate pivot axis about which the first plate is configured to pivot from a closed position arranged generally perpendicular to the second plate and an opened position extending away from the second plate, wherein the first plate further includes a force-distributing pad coupled to the inner surface of the first outer sheet and configured to reduce impact forces acting on an occupant of the vehicle during a collision event.

6. The door panel of claim 5, wherein the force-distributing pad includes a first plurality of ribs coupled to the inner surface of the first outer sheet.

7. The door panel of claim 6, wherein the second plate further includes a second force-distributing pad coupled to the inner surface of the second outer sheet and configured to reduce impact forces acting on the occupant of the vehicle.

8. The door panel of claim 7, wherein the first plurality of ribs includes a first plurality of longitudinal ribs extending along the first plate and spaced apart from one another to provide a first plurality of channels between neighboring longitudinal ribs included in the first plurality of longitudinal ribs, and a first plurality of transverse ribs arranged to lie within the first plurality of channels.

9. The door panel of claim 8, wherein the second force-distributing pad includes a second plurality of ribs coupled to the inner surface of the second outer sheet and extending away from the inner surface of the second outer sheet.

10. The door panel of claim 9, wherein the second plurality of ribs includes a second plurality of longitudinal ribs extending along the second outer sheet and spaced apart from one another to provide a second plurality of channels between neighboring longitudinal ribs included in the second plurality of longitudinal ribs, and a second plurality of transverse ribs arranged to lie within the second plurality of channels.

11. The door panel of claim 10, wherein the first plurality of transverse ribs extend away from the first outer sheet at a first angle relative to the second outer sheet and the second plurality of transverse ribs extend away from the second plate at a second angle relative to the second outer sheet.

12. The door panel of claim 11, wherein the first angle and the second angle are each within a range of about 50 degrees to about 60 degrees from the second outer sheet.

13. The door panel of claim 5, wherein the force-distributing pad includes a first plurality of ribs coupled to the inner surface of the first outer sheet and the second plate further includes a second force-distributing pad having a second plurality of ribs coupled to the inner surface of the second outer sheet, the first plurality of ribs including a first plurality of longitudinal ribs extending along the first plate and spaced apart from one another, and the second plurality of ribs including a second plurality of longitudinal ribs extending along the second plate and aligned with the first plurality of longitudinal ribs.

14. The door panel of claim 5, wherein the hinge includes a hinge body having a thickness less than the first outer sheet and the second outer sheet and a plurality of frangible retainer ribs coupled to the hinge body and extending between the first outer sheet and the second outer sheet, wherein the plurality of frangible retainer ribs are configured to retain the first plate in the closed position and are configured to break as the first plate pivots about the plate pivot axis from the closed position to the opened position in response to a force acting on the force-distributing pad of the first plate above a predetermined amount.

15. The door panel of claim 5, wherein the second plate further includes a retainer hook coupled to the inner surface of the second outer sheet and extending away from the second outer sheet to support an airbag.

16. An injection molded, interior panel for a vehicle, the interior panel comprising:
   a first plate,
   a second plate, and
   a hinge extending between and interconnecting the first plate and the second plate to establish a plate pivot axis about which the first plate is configured to pivot from a closed position and an opened position,
   wherein the first and second plates each include a sheet having an inner surface facing away from a cabin of the vehicle and an outer surface facing into the cabin of the vehicle, and at least one of the first plate and the second plate includes a force-distributing pad coupled to the inner surface and configured to reduce impact forces acting on an occupant of the vehicle during a collision event.

17. The interior panel of claim 16, wherein the force-distributing pad includes a plurality of longitudinal ribs extending along the inner surface and spaced apart from one another to provide a plurality of channels and a plurality of transverse ribs arranged to lie within the first plurality of channels, and wherein the plurality of transverse ribs are arranged to lie at an angle relative to the sheet of the second plate and the angle is within a range of about 50 degrees to about 60 degrees.

18. The interior panel of claim 17, wherein the force-distributing pad is coupled to the inner surface of the first plate and the second plate includes a second force-distributing pad having a second plurality of longitudinal ribs coupled to the inner surface of the second plate and aligned with the plurality of longitudinal ribs coupled to the inner surface of the first plate and a second plurality of transverse ribs arrange to lie in a second plurality of channels defined by the second plurality of longitudinal ribs and at the angle.

19. The door panel of claim 16, wherein the hinge includes a hinge body having a thickness less than the first outer sheet and the second outer sheet and a plurality of frangible retainer ribs coupled to the hinge body and extending between the first outer sheet and the second outer sheet, wherein the plurality of frangible retainer ribs are configured to retain the first plate in the closed position and are configured to break as the first plate pivots about the plate pivot axis from the closed position to the opened position in response to a force acting on the force-distributing pad of the first plate above a predetermined amount.

20. The door panel of claim 16, wherein the second plate further includes a retainer hook coupled to the inner surface of the second plate and extending away from the inner surface to support an airbag.

\* \* \* \* \*